US012275605B2

(12) United States Patent
Umbanhowar et al.

(10) Patent No.: US 12,275,605 B2
(45) Date of Patent: Apr. 15, 2025

(54) DEVICES FOR AND METHODS OF FORMING SEGREGATED LAYERS FROM MIXTURES OF GRANULAR MATERIALS

(71) Applicant: Northwestern University, Evanston, IL (US)

(72) Inventors: Paul B. Umbanhowar, Evanston, IL (US); Richard M. Lueptow, Evanston, IL (US); Yi Fan, Midland, MI (US)

(73) Assignee: Northwestern University, Evanston, IL (US)

( * ) Notice: Subject to any disclaimer, the term of this patent is extended or adjusted under 35 U.S.C. 154(b) by 1080 days.

(21) Appl. No.: 17/149,108

(22) Filed: Jan. 14, 2021

(65) Prior Publication Data

US 2021/0130116 A1 May 6, 2021

Related U.S. Application Data

(62) Division of application No. 15/984,533, filed on May 21, 2018, now Pat. No. 10,926,966.

(60) Provisional application No. 62/510,041, filed on May 23, 2017.

(51) Int. Cl.
*B65G 69/10* (2006.01)
*B01F 25/80* (2022.01)
*B01F 31/23* (2022.01)
*B01F 31/60* (2022.01)

(52) U.S. Cl.
CPC ............ *B65G 69/10* (2013.01); *B01F 25/80* (2022.01); *B01F 31/23* (2022.01); *B01F 31/60* (2022.01)

(58) Field of Classification Search
CPC .......... B65G 69/10; B01F 25/80; B01F 31/23; B01F 31/60; B01F 31/46
USPC .................... 366/111, 112, 114, 115, 116
See application file for complete search history.

(56) References Cited

U.S. PATENT DOCUMENTS

| | | | |
|---|---|---|---|
| 2,262,702 A | 11/1941 | Stamer et al. | |
| 2,281,497 A * | 4/1942 | Hyson | F23K 3/06 366/291 |
| 2,281,498 A * | 4/1942 | Hyson | B65G 69/10 414/803 |
| 2,328,147 A * | 8/1943 | Hyson | C10L 5/00 44/628 |
| 2,332,512 A | 10/1943 | Goshom et al. | |
| 2,446,818 A * | 8/1948 | Flam | B28B 1/0873 74/61 |
| 2,700,604 A | 1/1955 | Knight | |
| 2,857,936 A | 10/1958 | Lockwood | |
| 3,078,076 A * | 2/1963 | Ferguson | B65G 69/10 366/186 |
| 3,094,243 A | 6/1963 | Haugen | |
| 3,233,877 A | 2/1966 | Kelly | |
| 3,294,292 A | 12/1966 | Adam et al. | |
| 3,327,611 A | 6/1967 | Hans | |
| 3,353,949 A | 12/1967 | Nau | |
| 3,606,954 A | 9/1971 | Mayer | |
| 3,666,119 A | 5/1972 | Parsons | |
| 3,782,528 A * | 1/1974 | Burger | B65G 47/00 198/570 |
| 3,814,386 A * | 6/1974 | Guglietti | B01F 25/90 366/154.2 |
| 3,860,129 A | 1/1975 | Bieth et al. | |
| 3,866,885 A * | 2/1975 | Gerstel | B65G 65/28 366/135 |
| 3,913,761 A | 10/1975 | Proner et al. | |
| 3,939,238 A | 2/1976 | Salts | |
| 3,958,795 A * | 5/1976 | Boenisch | B01F 33/80 222/394 |
| 4,023,776 A * | 5/1977 | Greten | B27N 3/14 366/153.2 |
| 4,607,979 A | 8/1986 | Morrison | |
| 4,657,431 A | 4/1987 | Morrison | |
| 4,721,425 A | 1/1988 | Strocker | |
| 4,744,459 A * | 5/1988 | Ryan | B65G 69/10 198/569 |
| 5,211,319 A | 5/1993 | Reinholdsson | |
| 5,248,197 A | 9/1993 | Storf et al. | |
| 5,959,870 A | 9/1999 | Hurwitz et al. | |
| 6,357,905 B1 | 3/2002 | Birchard | |
| 6,382,947 B1 | 5/2002 | Bryant | |
| 6,923,565 B2 | 8/2005 | Johnson | |
| 9,636,842 B2 | 5/2017 | Foppe | |
| 10,926,966 B2 * | 2/2021 | Umbanhowar | B01F 25/80 |
| 2018/0339871 A1 * | 11/2018 | Umbanhowar | B01F 31/23 |

(Continued)

FOREIGN PATENT DOCUMENTS

| | | | | |
|---|---|---|---|---|
| DE | 10302475 A1 * | 8/2004 | ............. | B22F 3/004 |
| GB | 637691 A * | 5/1952 | | |
| SU | 1084148 A1 * | 4/1984 | | |

OTHER PUBLICATIONS

Machine translation of DE 10302475 A1 Aug. 2004.*
Non-Final Office Action issued in U.S. Appl. No. 15/984,533, dated Jul. 28, 2020.

*Primary Examiner* — Charles Cooley

(74) *Attorney, Agent, or Firm* — Benesch Friedlander Coplan & Aronoff LLP

(57) ABSTRACT

Layering of initially mixed granular dissimilar material components deposited by surface flow is realized by varying the relative angle of the flowing layer periodically with respect to the bulk of the pile formed. Layer thickness and extent can be controlled by varying the timing and extent of the surface variations. Variation in surface flow rates may be realized by varying the feed rate from an inlet to a collection base at a fixed feed location, varying the feed location relative to the collection base, tilting the collection base that is supporting the material, and reducing the pile repose angle using vibration or fluid flow through the base.

16 Claims, 5 Drawing Sheets

(56) References Cited

U.S. PATENT DOCUMENTS

2021/0130116 A1\* 5/2021 Umbanhowar ........ B65G 69/10
2024/0416395 A1\* 12/2024 Merkel ...................... B01J 8/40

\* cited by examiner

DEVICES FOR AND METHODS OF FORMING SEGREGATED LAYERS FROM MIXTURES OF GRANULAR MATERIALS

CROSS-REFERENCE TO RELATED APPLICATION

This application claims priority to and is a divisional application of U.S. patent application Ser. No. 15/984,533, filed May 21, 2018, which claims the benefit of U.S. Provisional Patent Application Ser. No. 62/510,041, filed May 23, 2017. The entire contents of each of these applications are incorporated herein by reference.

BACKGROUND

Field of the Invention

The present invention relates to devices and processes for layering mixtures of granular materials with different physical properties such as size, shape, and density that are deposited onto static regions by surface flows. The devices and methods can be used to reduce segregation by creating layers of different particle types in common industrial processes utilizing particulate matter flows including the filling of hoppers, boxes, and other enclosed vessels as well as the formation of free-standing piles.

Description of the Prior Art

Mixtures of particles having different physical properties such as size, shape, density, friction coefficient, and stiffness tend to segregate when they are allowed to flow under gravity. Segregation of different particles is a ubiquitous problem that has long plagued processes in which granular materials are poured to form piles or to flow along chutes. Typically, the greater the difference in physical properties the greater is the amount of segregation. For example, in a silo filled from a center location with a mixture of freely flowing large and small particles, a conical pile or heap forms that is enriched in small particles at the center of the cone and enriched in large particles at the periphery.

Various methods and devices have been described in the prior art to limit segregation of flowing mixtures. One class of methods seeks to modify the surface properties of particles or the composition of the mixture to reduce segregation. For example, U.S. Pat. No. 3,353,949 describes a series of liquid conditioners which, when sprayed on the mixture in question, cause fines (small particles) to adhere to the surfaces of larger particles to prevent segregation during flow. Along similar lines, U.S. Pat. No. 2,700,604 discusses a method of reducing segregation using mixtures with various degrees of hydration to induce increased cohesion between the elements, which reduces segregation during flow.

An alternative approach to controlling segregation by modifying the properties of the mixture, and one that is applicable to hoppers and other discharging geometries, involves devices that remove material from locations other than a centrally located hole in the bottom of the device. For hoppers in which material is already segregated, U.S. Pat. No. 3,294,292 describes a device consisting of multiple tubes extending into the bulk of the hopper that can withdraw material simultaneously from regions differing in local concentration. In U.S. Pat. No. 2,262,702 a discharge pan located in the center of a hopper and with a variable aperture controls the rate of fines discharging from the middle of the material in relation to the uncontrolled discharge of larger particles from the periphery of the hopper.

Yet a third approach seeks to maintain good mixing of materials by limiting segregation during filling. U.S. Pat. No. 2,857,936 describes a device in which a plurality of downwardly inclined narrow chute-like supporting surfaces limits segregation. In contrast, U.S. Pat. No. 2,332,512 describes a device in which particle mixtures fall through screens and onto a shelf, which then is slowly removed allowing the particles resting on the shelf to fall straight into a container directly below the shelf and with the same cross section as the shelf. As a final example, in U.S. Pat. No. 3,094,243 a top discharging silo is described in which material flows from the surface through a centrally located tube from which the material then falls.

SUMMARY OF THE INVENTION

Mixed granular materials composed of grains differing in size, roughness, stiffness, density and other physical and surface properties tend to segregate when they flow. Of particular concern for industry is the segregation that occurs when particles flow down the surface of piles or heaps formed when granular materials are dispensed or deposited to a collection base, such as into a hopper, bag, drum, or vehicle bed as well as onto a flat surface into a free-standing pile. The collection base or flat surface can additionally be mounted on or be part of a vehicle, railroad car, ship, or barge. Controlling the spatial extent of segregation of granular dissimilar material components is important in many industries including chemical, pharmaceutical, agricultural, mining and manufacturing, as variation in product concentration can deleteriously impact product/process efficacy and efficiency.

Described herein are devices and methods in which, rather than attempting to limit segregation, stratification of dissimilar components in the deposited material (e.g., the body of a pile) is induced and controlled by varying the free surface flow. By varying the spatial and temporal features of the surface flow, the extent of layering can be made comparable to the container dimensions and the layer thickness can be reduced to a few (~5-10) times the particle size. The resulting stratified particle configurations significantly reduce overall segregation at length scales larger than the stratification dimension and at right angles to the layers. Layers can additionally be useful for adding structure to mixed precursor materials.

The claimed devices for and methods of reducing segregation through controlled stratification can be accomplished through various mechanisms and with relatively minor modifications to existing filling equipment. The claimed devices do not require re-processing of already poured material or feedback once effective modulation parameters have been identified for a particular geometry and mixture. The claimed devices allow control of stratification thickness and extent along the streamwise direction of the flow and can be implemented without altering particle properties or properties of the surrounding fluids, which typically will be air.

In a first aspect, the disclosure presents a method of reducing segregation of mixtures of granular dissimilar material components having different physical properties, including flowing a mixture of granular dissimilar material components through an inlet, depositing the granular dissimilar material components on a collection base wherein the inlet is spaced a distance above the collection base, and varying an angle of a free surface of collected deposited flow from the inlet to the collection base periodically so as to provide controlled layering of the granular dissimilar material components.

In a second aspect, the disclosure presents devices for reducing segregation of mixtures of granular dissimilar material components having different physical properties, including an inlet that provides flow of the granular dissimilar material components, a collection base, wherein the inlet is spaced a distance above the collection base, and wherein an angle of a free surface of collected flow from the inlet to the collection base is varied periodically so as to provide controlled layering of the dissimilar material components.

BRIEF DESCRIPTION OF THE DRAWINGS

In describing the preferred embodiments, reference is made to the accompanying drawing figures wherein like parts have like reference numerals, and wherein.

Figure 1:
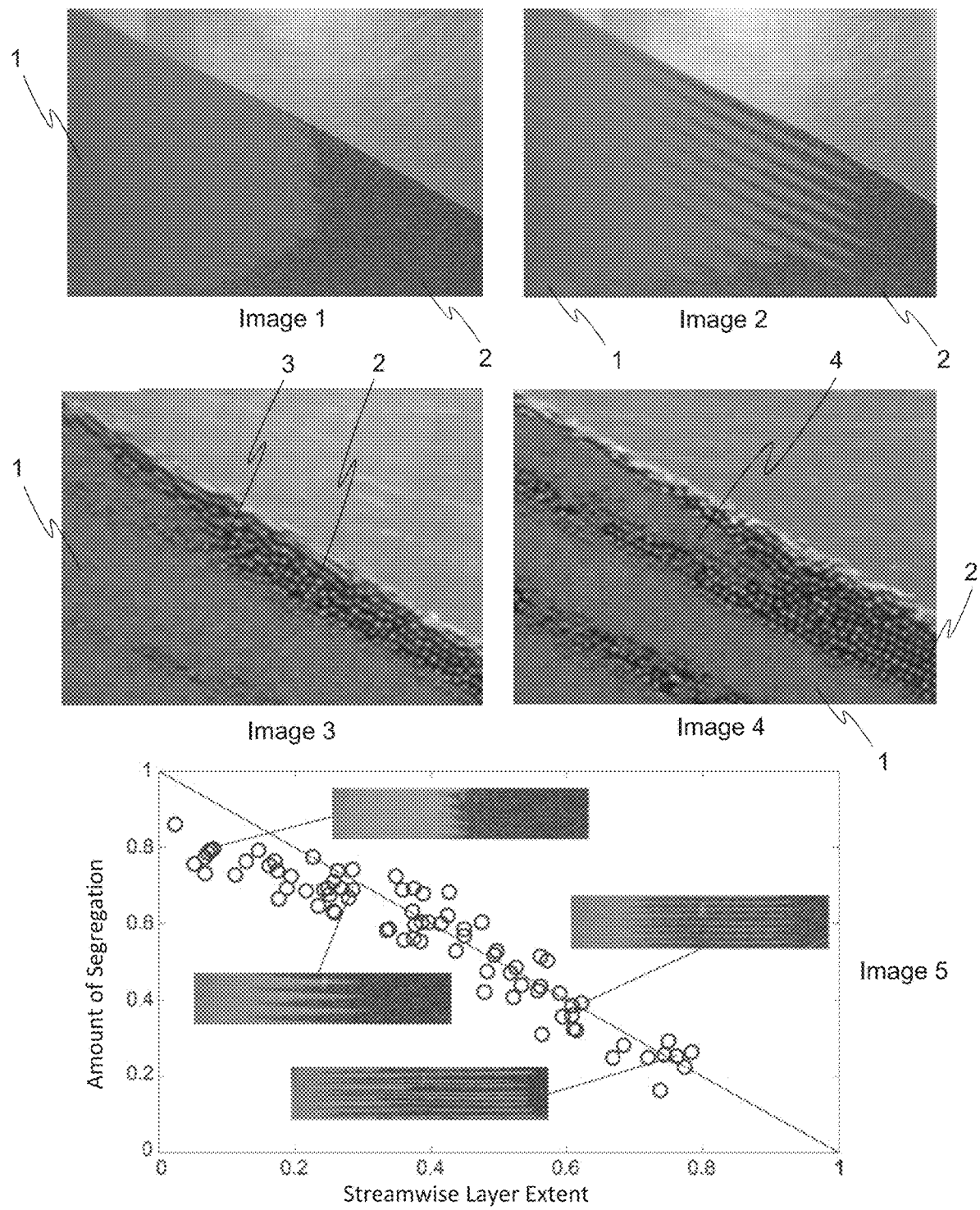
FIG. 1 provides images of stratification examples and an image relating to a comparison of the amount of segregation relative to streamwise layer extent, FIG. 2 provides images relating to an example of stratification via flow rate modulation.

It should be understood that the drawings are not to scale and that features of the stratified layers have been exaggerated in the drawings in FIGS. 2-6 to highlight the associated methods. While some mechanical details of example devices for reducing segregation of flowing mixtures of granular dissimilar material components having different physical properties, including other images of the example inlets and collection bases shown and of examples that may have alternative configurations, have not been included, such details are considered well within the comprehension of those of skill in the art in light of the present disclosure. It also should be understood that the present invention is not limited to the example embodiments illustrated.

DETAILED DESCRIPTION OF THE INVENTION

This invention describes devices for and methods of controlling layering (stratification) of materials deposited from free surface flows by varying (modulating) the relative angle of the free surface flowing layer with respect to the underlying material (the bulk), periodically. Generically, initially mixed collections of particles with different physical properties flowing down a slope segregate in the direction normal to the free surface. For example, larger particles rise, or percolate, to the top of the flowing surface layer, while smaller particles descend, or percolate, to the bottom of the flowing layer. When a mixture of small and large particles pours over a growing heap or pile, small particles percolating downward in the flowing layer deposit in the upstream portion of the flowing layer to form the portion of the pile or heap nearer its peak, thereby enriching the flowing layer further downstream with the upward percolating large particles, which are then deposited further downstream on the lower portion of the pile or heap. FIG. 1 presents five images, with Image 1 showing an example of streamwise segregation where small particles 1 and large particles 2 are fed into a bin on the left and the small particles 1 deposit in the upstream region of the pile while the large particles 2 are deposited in the downstream region. It will be appreciated that the tendency of particles to percolate upward or downward may be based on characteristics other than a difference in size. For instance, particles having the same size but different densities may result in the upward percolating particles being of lower density and the downward percolating particles being of higher density.

Varying the angle of the free surface by changing the volumetric feed rate causes layers of particles to form with upward percolating particles being deposited further upstream and downward percolating particles being deposited further downstream than occurs with a constant flow rate. Image 2 in FIG. 1 illustrates this layering for downward percolating of small particles 1 and upward percolating of large particles 2. Layering of material occurs with changes in the free surface slope relative to the bulk of the material collected. When the relative slope of the feed material is increased by increasing the feed rate, a wedge of higher slope material 3 in Image 3 propagates down the free surface that is enriched in upward percolating particles at its downstream terminus. These upward percolating particles are buried as the wedge advances downstream forming a layer of upward percolating large particles 2 that extends further upstream than would occur without the higher slope caused by the increased feed rate. When the relative slope of the feed material is decreased by reducing the feed rate, such as in Image 4, the material advancing down the heap carries with it the downward percolating small particles 1 previously deposited in the upstream region of the flow, which forms a downward percolating particle layer 4 extending further downstream than would occur without the lower slope due to the decreased flow rate. For a given mixture of granular dissimilar material components, the streamwise extent and thickness of the layers can be controlled through variation in the angle of the free surface which, in turn, allows the amount of segregation to be varied, as shown in Image 5 for the length of the layers ("Streamwise Layer Extent"). The variation in the angle of the free surface can occur at regular intervals, as is shown in the examples in FIG. 1, or it can occur at irregular intervals to generate layers of varying streamwise extent or thickness.

Variation in the free surface flow angle can be realized in different ways. One method, as described in FIG. 1, is to vary the feed rate through an inlet that is spaced above a collection base, i.e. to vary the amount of material fed onto the heap per unit of time, since increasing the feed rate increases the angle of the flowing layer and vice versa. The feed rate of the mixture of granular dissimilar material components can be varied in many ways including changing the speed of the feeding auger or conveyor or other transfer apparatus or by varying the outlet diameter of a feeding inlet, such as a feed tube, chute or hopper.

Figure 2:
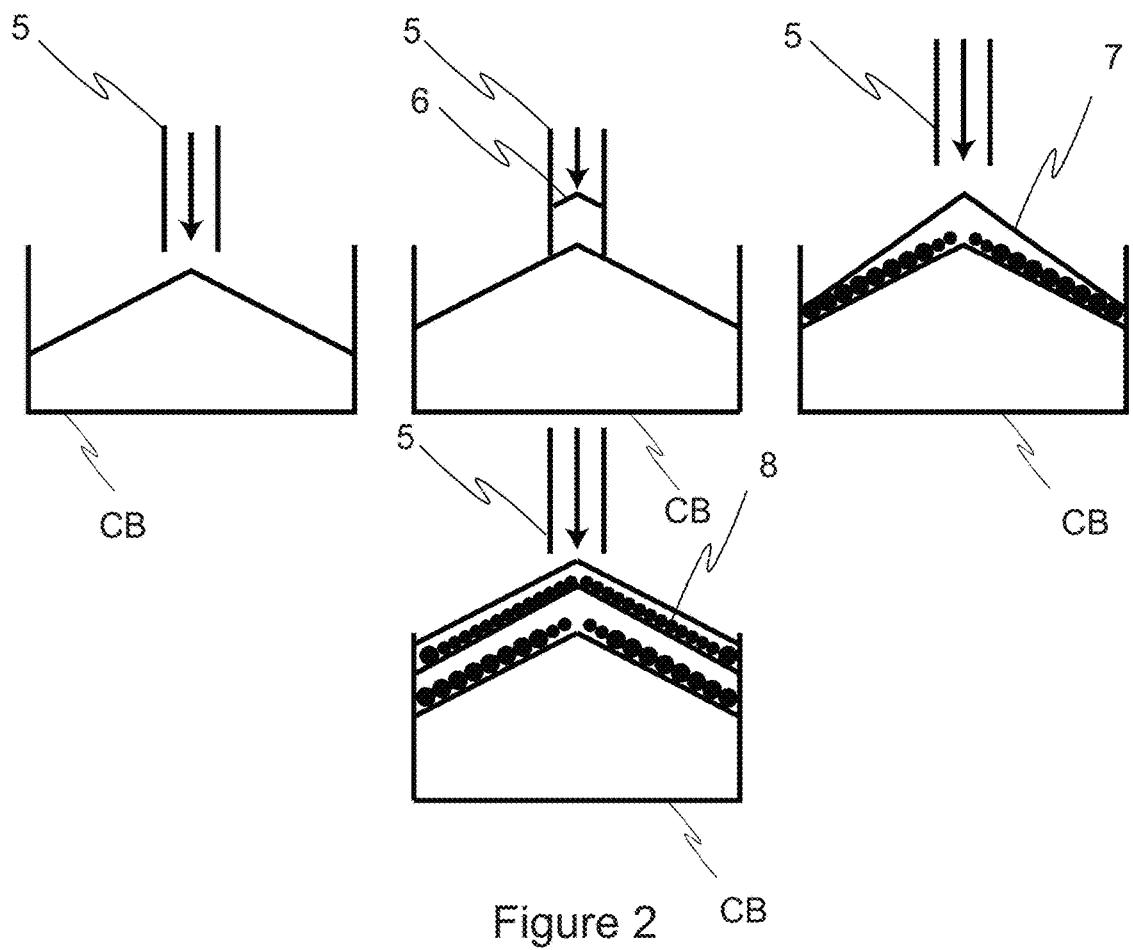

FIG. 2 shows the steps (left to right) for another method of varying the feed rate employing an inlet 5 shown as a feed tube controlled to intermittently or periodically move in the vertical direction relative to a collection base CB. A mixture of granular dissimilar material components is fed through the inlet, shown as a feed tube 5, at a constant rate. When the pile or heap deposited on the collection base rises to the bottom of the feed tube 5, material 6 builds up in the feed tube 5. Quickly raising the feed tube 5 results in the release of material at a faster rate than the feed rate into the feed tube 5, which deposits a layer of upward percolating material 7 (large particles in this case) further upstream from the heap than would otherwise occur. After the material trapped in the feed tube 5 has been released, the feed rate decreases and the surface relaxes resulting in an overlying layer of downward percolating particles 8 (smaller particles in this case) in the downstream region.

Figure 3:
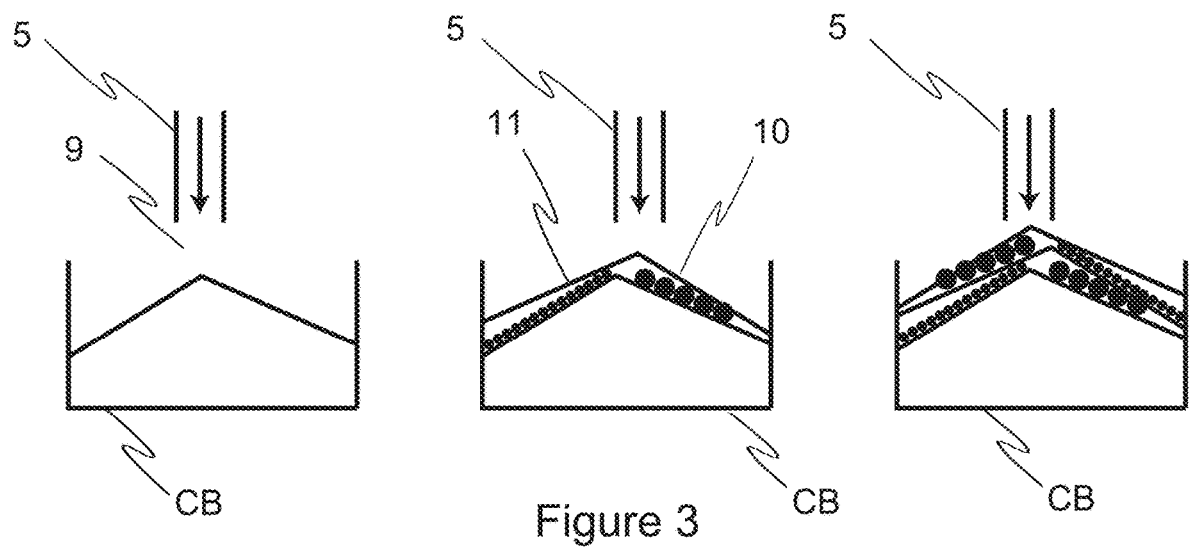
FIG. 3 provides images relating to an example of stratification via moving the feed zone or the collection base.

FIG. 3 shows the steps for a different embodiment that varies the free surface angle by periodically moving the feed zone 9 (the area below the inlet, such as feed tube 5) horizontally. When the feed zone provided by material flowing through the inlet is displaced horizontally relative to the collection base CB, the local flux of material increases in the direction of the displacement causing the surface angle in this direction to increase, while the local flux of material in the direction opposite the displacement decreases causing the surface angle to decrease. This is shown in FIG. 3 via the variation from the left image to the center image, where the feed zone moves from above the peak of the heap to the right of the peak of the heap. This produces a layer enriched in upward percolating larger particles 10 extending further upstream on the same side as the rightward displacement and a layer enriched in downward percolating smaller particles 11 extending further downstream on the side opposite the displacement. The displacement of the feed tube 5 relative to the collection base CB then moves leftward in the right image so the feed zone is to the left of the peak of the heap. This produces a layer enriched in upward percolating larger particles extending further upstream on the same side as the leftward displacement and a layer enriched in downward percolating smaller particles 11 extending further downstream on the side opposite the displacement thereby resulting in layers of upward percolating large particles and downward percolating small particles. Equivalently, the inlet can be kept stationary and the container base moved horizontally when the container base is mounted on or is part of a dedicated mechanism or a vehicle, railroad car, ship, or barge.

Figure 4:
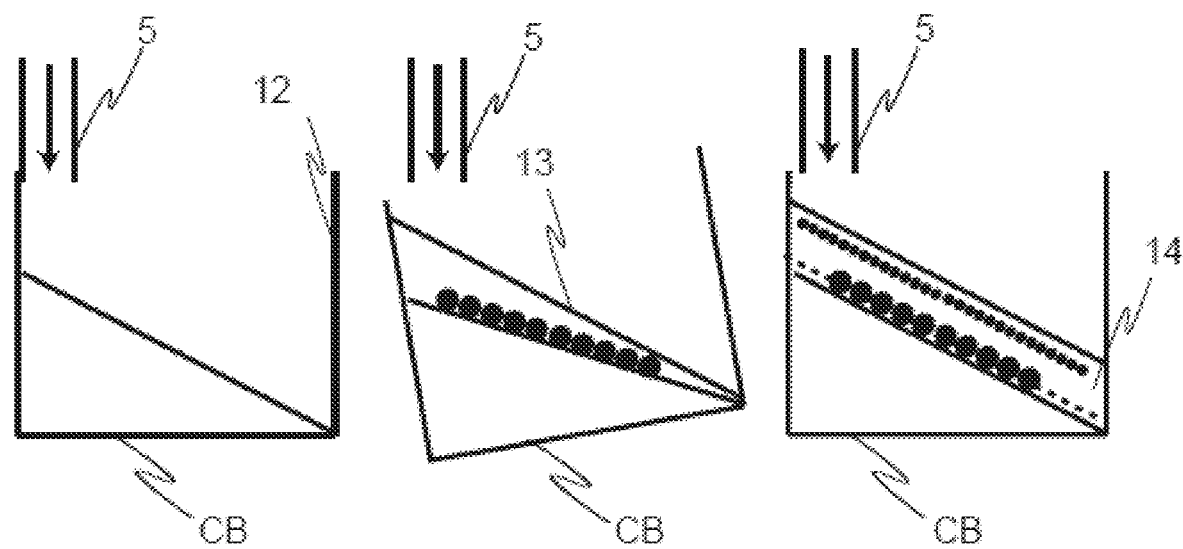
FIG. 4 provides images relating to an example of stratification via tilting the collection base.

FIG. 4 shows steps for another method of layering the deposited mixture of granular dissimilar material components collected by a collection base CB, shown in this example as a container 12, which is achieved by controlling the flowing layer angle by tilting the container periodically. When the container 12 is tilted up to reduce the angle of the already deposited material relative to the inlet, such as feed tube 5, a new wedge of material with a relatively higher slope 13 grows on top of the old layer, so that upward percolating particles deposit further upstream to form a layer of upward percolating particles extending further upstream. When the container 12 is tilted down to its initial orientation the surface relaxes back to its original repose or surface angle, and downward percolating particles 14 are carried further downstream to form a layer of downward percolating particles extending further downstream.

Figure 5A:
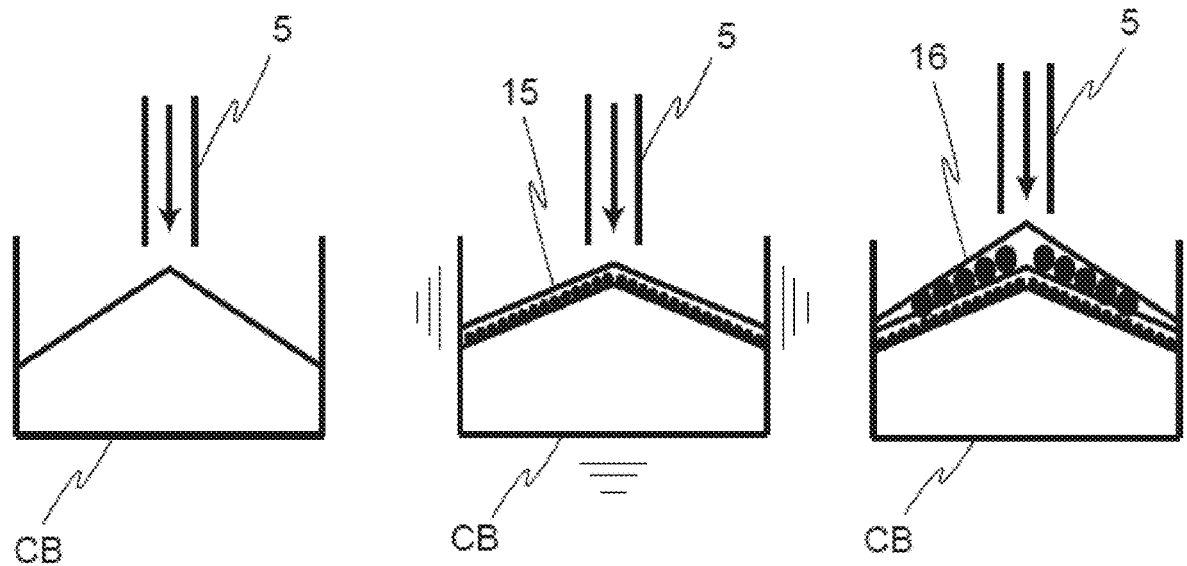
FIG. 5A and FIG. 5B provide images relating to examples of stratification via vibrating the collection base or partially fluidizing the bed of material.
Figure 5B:
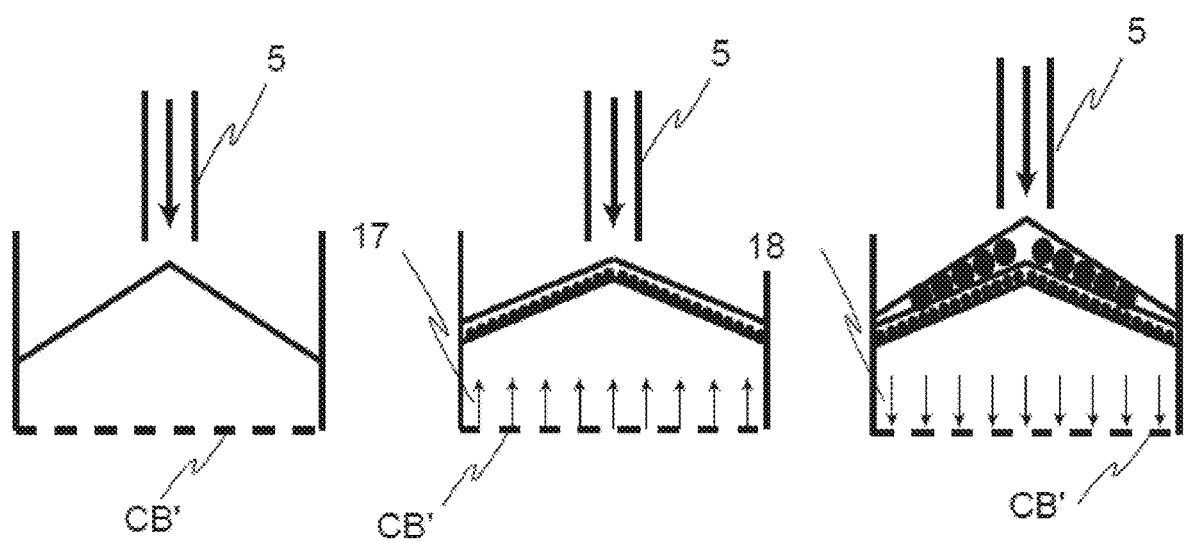

Another method of varying the relative angle of the bulk and the flowing layer of a mixture of granular dissimilar material components flowing from an inlet, such as feed tube 5, is achieved by varying the static angle of repose of the material periodically, as shown in FIG. 5A. One method (top row of images in FIG. 5A) employs vibration: a pile in the left image, previously formed in the absence of vibration, relaxes to a smaller angle in the center image when it is vibrated, causing previously deposited downward percolating smaller particles 15 to flow further downstream to create a layer of downward percolating particles extending further downstream. Halting the vibration with material still flowing onto the heap increases the surface angle, as shown in the right image, which deposits a layer of upward percolating larger particles 16 further upstream resulting in a layer of upward percolating particles extending further upstream.

Similar variation in the surface angle also can be achieved (bottom row of FIG. 5B) by blowing or sucking an interstitial fluid (typically air) through the bed of previously deposited material during filling using a porous distributor forming an alternative collection base CB' for the pile and with pore size (exaggerated in the images for ease of viewing) which would be smaller than the smallest particle size. With upward airflow 17 the surface angle of the pile or heap decreases allowing downward percolating particles to flow further downstream to form a layer of downward percolating particles extending further downstream. Stopping the airflow or creating downward flow 18 increases the angle of the free surface flow resulting in the deposition of upward percolating particles further upstream to cause a layer of upward percolating particles to extend further upstream.

Figure 6:
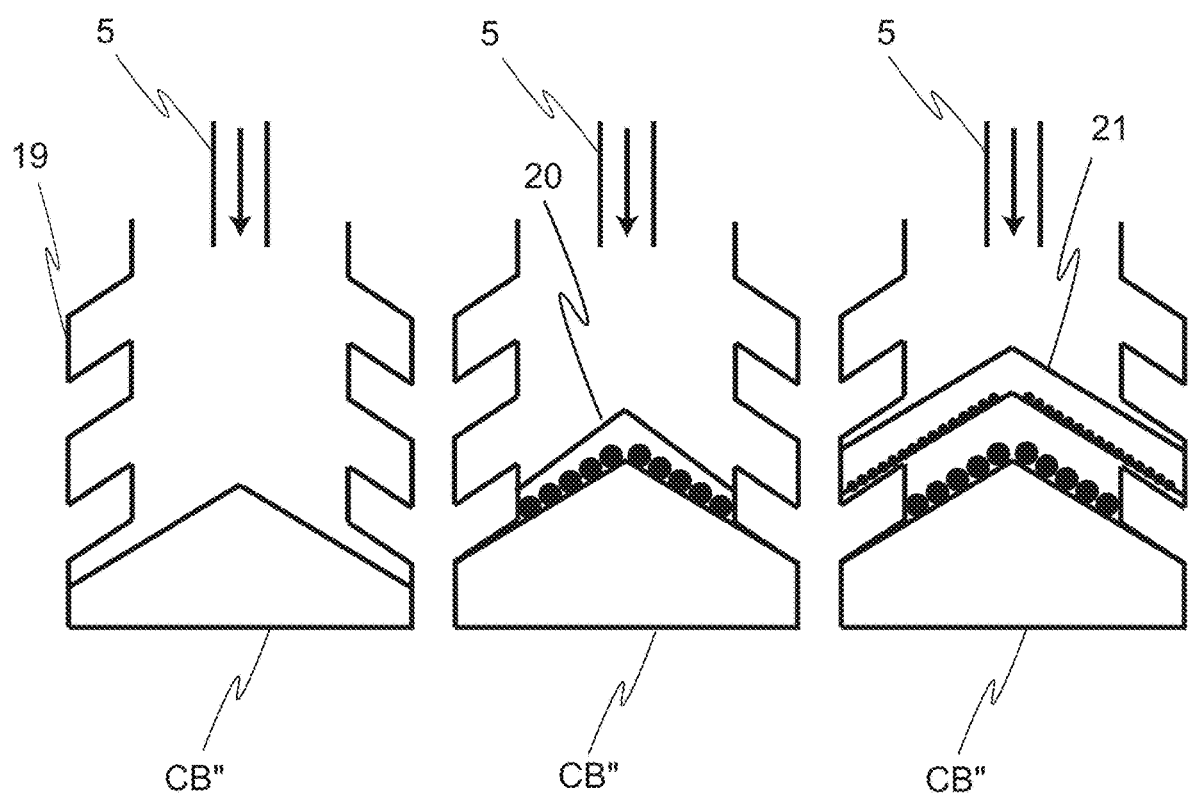
FIG. 6 provides images relating to an example of stratification via vertical variation in horizontal cross-section of a collection base in the form of a container.

FIG. 6 illustrates an embodiment in which the horizontal cross-section of an alternative collection base CB" varies in the vertical direction in what generally can be described as a periodic manner. As the container 19 is filled via an inlet, such as feed tube 5, at a constant feed rate, the rate at which the surface of the deposited material rises increases when the local cross-sectional area 20 is smaller—resulting in a higher flowing layer angle, and the rate at which the surface rises decreases when the cross-sectional area is larger 21—resulting in a lower angle of the flowing surface layer. As in all cases, when the surface angle increases, a layer of upward percolating larger particles is deposited that extends further upstream, and when the surface angle decreases, a layer of downward percolating particles is deposited that extends further downstream.

The above described devices and methods for intentionally inducing stratified or controlled layers of particles having different properties by changing the angle of the flowing layer are illustrative examples. Other devices and methods or variations on the above approaches can be used to modulate the angle of the flowing layer in order to induce stratification of segregating particles. What we claim here is only limited by the appended claims. The invention requires only an inlet and a collection base along with varying the flowing layer angle periodically when flowing a mixture of granular dissimilar material components from an inlet to a collection base in order to generate layers of particles of different properties.

Likewise, we have only described situations for two particle types, but the same methods can be used to generate layers of different particle types for three or more particle types. Indeed, while this invention is susceptible of embodiment in many different forms, the drawings show embodiments with the understanding that the present disclosure can be considered as an exemplification of the principals of the invention and is not intended to limit the invention to the example embodiments illustrated, and is only limited by the appended claims and legal equivalents thereof.

The invention claimed is:
1. A method of reducing segregation of mixtures of granular dissimilar material components having different physical properties, comprising:
flowing a mixture of granular dissimilar material components through an inlet;
depositing the granular dissimilar material components on a collection base wherein the inlet is spaced a distance above the collection base; and varying an angle of a free surface of collected deposited flow from the inlet to the collection base periodically so as to provide controlled layering of the granular dissimilar material components, wherein varying the angle of the free surface of the collected deposited flow from the inlet to the collection base comprises varying a static angle of repose of the granular dissimilar material components periodically, comprising:

forming a first pile of the granular dissimilar material components at the collection base absence of vibration;

applying vibration to the first pile of the granular dissimilar material components; and halting the vibration while forming a second pile of granular dissimilar material components on top of the first pile.

2. The method of claim 1 wherein the different physical properties of the granular dissimilar material components include size, shape, roughness or density.

3. The method of claim 1 wherein varying the angle of the free surface of collected deposited flow from the inlet to the collection base occurs at regular intervals.

4. The method of claim 1 wherein varying the angle of the free surface of collected deposited flow from the inlet to the collection base occurs at irregular intervals.

5. The method of claim 1 wherein the angle that the free surface of collected deposited flow from the inlet to the collection base changes each time it is varied.

6. The method of claim 1 wherein varying the angle of the free surface of the collected deposited flow from the inlet to the collection base is achieved by varying the feed rate of the granular dissimilar material components flowing through the inlet.

7. The method of claim 1 wherein varying the angle of the free surface of the collected deposited flow from the inlet to the collection base is achieved by varying the distance the inlet is spaced above the collection base.

8. The method of claim 1 wherein varying the angle of the free surface of the collected deposited flow from the inlet to the collection base is achieved by varying a location of the inlet horizontally relative to the collection base.

9. The method of claim 1 wherein varying the angle of the free surface of the collected deposited flow from the inlet to the collection base is achieved by varying a tilt angle of the collection base.

10. The method of claim 1 wherein varying the angle of the free surface of the collected deposited flow from the inlet to the collection base is achieved by varying flow of a fluid through the collection base.

11. The method of claim 1 wherein varying the angle of the free surface of the collected deposited flow from the inlet to the collection base is achieved by varying a horizontal cross-section of the collection base.

12. The method of claim 1 wherein the inlet further comprises a feed tube or chute.

13. The method of claim 1 wherein the collection base further comprises a surface that supports a deposited free standing pile of granular dissimilar material components.

14. The method of claim 1 wherein the collection base further comprises a container.

15. The method of claim 14 wherein the container further comprises a hopper, bag, box, bin, vehicle bed, or drum.

16. The method of claim 14 wherein the container is mounted on or is part of a vehicle, railroad car, ship, or barge.

\* \* \* \* \*